United States Patent Office.

ISAAC V. REAGLES, OF SCHENECTADY, NEW YORK, ASSIGNOR OF TWO-THIRDS TO ISAAC Y. FULLER, OF SAME PLACE, AND WILLIAM A. FISH, OF UTICA, NEW YORK.

COMPOSITION OF MATTER FOR WATERPROOFING.

SPECIFICATION forming part of Letters Patent No. 311,203, dated January 27, 1885.

Application filed November 19, 1883. (Specimens.)

*To all whom it may concern:*

Be it known that I, ISAAC V. REAGLES, a citizen of the United States of America, a resident of the city of Schenectady, in the county of Schenectady and State of New York, have invented a new and useful Composition of Matter to be used for Rendering Substances Impervious to Water, of which the following is a specification.

My invention relates to that class of "compositions of matter" used to saturate textile material—felts, leather, or paper—for the purpose of rendering them water-proof, and for coating or covering all animal, vegetable, and mineral substances requiring preservation, the object being to provide a composition of matter for the purposes stated which is of more extensive application and of a more durable quality than compounds now used in the art.

This composition of matter is made of the following-named ingredients and substantially in the proportions stated, to wit: of wood-alcohol, one gallon; of castor-oil, one pound; of camphor-gum, one pound; of pyroxyline or soluble cotton, paper, or fiber, one pound, and of finely-pulverized gum-shellac, one-fourth of a pound.

If the composition is to be applied to textile materials, a less quantity of gum-shellac will be required, and in order to prevent the gum-shellac from granulating no more should be used at any time than the composition will properly and completely absorb. To the mixture may be added as a coloring any of the dyes now in common use, so as to make the mixture applicable to the fabric or to give the object to which it is applied the desired color.

The method of preparing and mixing the ingredients is as follows: In a suitable vessel place a quantity of rags, in order to form a seat for another vessel of suitable capacity to be placed therein to contain the quantity of mixture desired, and in the larger vessel a quantity of water is poured, sufficient to nearly immerse the smaller vessel. The alcohol is then poured in the inner vessel, and to prevent evaporation a cloth or cover is then put over it. The vessels are then put over the fire and gradually heated until the water commences to boil. The other ingredients are then gradually added to the alcohol, stirring them in, and continuing to stir until the ingredients are completely dissolved and thoroughly mixed. After the mixture has been effected the composition is placed in an air-tight vessel and allowed to gradually cool, in order that it may be preserved for use.

When required for use, the composition must again be subjected to a similar process of heating in a warm-water bath, and when of about the temperature of "blood-heat" is applied to the material, either by immersion or with a brush, the surrounding temperature of the room being maintained at, say, 80° to 90° Fahrenheit.

Should the composition be too thick for the particular use desired in any special instance, it may be thinned by adding more alcohol. The castor-oil has the property of rendering all the other ingredients readily soluble in alcohol. The pyroxyline, which is the main waterproofing element, is kept from shrinking and cracking by the gum-shellac, and the gum-champor gives a viscosity and adhesiveness to the compound when melted which causes it to tenaciously remain where applied. The proportions of the ingredients, while they may be varied somewhat, are such that each will have its due influence as above upon the composition as a whole.

I do not claim, broadly, mixing camphor with pyroxyline and gums or resins, as such a mixture is not new; nor do I claim mixing vegetable or mineral oils with gun-cotton, collodion, xyloidine, or their equivalents. Neither do I claim any mixture of ether with gun-cotton, so that it may be readily mixed with oils or gums. In such a mixture the ether is so rapidly evaporated by heat that the compound becomes thick too soon to permit the operation of applying the compound to be continued for any great length of time without frequent thinning out, while in my composition the solvent alcohol and castor-oil evaporate slowly, and the compound remains fluent for a sufficient length of time to permit extended continuous operations in applying it.

What I claim as my invention, and desire to secure by Letters Patent, is—

The herein-described waterproofing compound, consisting of the following ingredients in the proportions essentially as stated, to wit: wood-alcohol, one gallon; castor-oil, one pound; gum-camphor, one pound, pyroxyline, one pound; gum-shellac, one-fourth of a pound.

In testimony I have hereunto fixed my signature in the presence of two attesting witnesses.

ISAAC V. REAGLES.

Attest:
E. NOTT SCHERMERHORN,
JAMES FULLER, Jr.